US010836296B2

(12) United States Patent
Hall

(10) Patent No.: US 10,836,296 B2
(45) Date of Patent: Nov. 17, 2020

(54) FEED DISTRIBUTION ASSEMBLY

(71) Applicant: Robert Hall, West Columbia, SC (US)

(72) Inventor: Robert Hall, West Columbia, SC (US)

( * ) Notice: Subject to any disclaimer, the term of this patent is extended or adjusted under 35 U.S.C. 154(b) by 126 days.

(21) Appl. No.: 16/009,662

(22) Filed: Jun. 15, 2018

(65) Prior Publication Data

US 2019/0381926 A1 Dec. 19, 2019

(51) Int. Cl.
| | |
|---|---|
| *B60P 1/42* | (2006.01) |
| *B60P 3/00* | (2006.01) |
| *B65G 11/02* | (2006.01) |
| *B65G 33/14* | (2006.01) |
| *B65G 37/00* | (2006.01) |
| *B65G 3/04* | (2006.01) |
| *A01K 5/00* | (2006.01) |
| *E06C 9/02* | (2006.01) |
| *B65D 88/30* | (2006.01) |

(52) U.S. Cl.
CPC ................... *B60P 1/42* (2013.01); *A01K 5/00* (2013.01); *B60P 3/00* (2013.01); *B65D 88/30* (2013.01); *B65G 3/04* (2013.01); *B65G 11/026* (2013.01); *B65G 33/14* (2013.01); *B65G 37/00* (2013.01); *E06C 9/02* (2013.01); *B65G 2812/0511* (2013.01); *B65G 2812/0577* (2013.01)

(58) Field of Classification Search
CPC ... B60P 1/42; B60P 3/00; B65D 88/30; B65G 11/026; B65G 37/00; B65G 2812/0511; B65G 2812/0577; E06C 9/02; A01K 5/00
See application file for complete search history.

(56) References Cited

U.S. PATENT DOCUMENTS

| | | | | |
|---|---|---|---|---|
| 2,670,866 | A | | 3/1954 | Glesby |
| 4,111,314 | A | | 9/1978 | Nelson |
| 4,744,183 | A | * | 5/1988 | Kruger ................. B65D 90/623 220/262 |
| 5,339,996 | A | | 8/1994 | Dubbert |
| D543,666 | S | | 5/2007 | Ross |
| 7,370,605 | B2 | | 5/2008 | Meritt |
| 8,573,917 | B2 | * | 11/2013 | Renyer ................. A01C 15/003 414/523 |
| 9,440,787 | B1 | | 9/2016 | Cochran |
| 9,580,238 | B2 | | 2/2017 | Friesen |
| 2016/0130095 | A1 | * | 5/2016 | Oren ...................... B65G 65/40 414/414 |
| 2017/0354091 | A1 | * | 12/2017 | Van Mill ................. A01D 90/10 |
| 2019/0292804 | A1 | * | 9/2019 | Kensinger ............. E04H 12/182 |

* cited by examiner

*Primary Examiner* — Saul Rodriguez
*Assistant Examiner* — Ashley K Romano

(57) ABSTRACT

A feed distribution assembly for transporting and dispensing feed includes a trailer and a silo. The silo is coupled to a bed of the trailer and is configured to position feed. The trailer is configured to couple to a vehicle to transport the feed to a desired location. An auger is coupled to a bottom of the silo. The auger is configured to selectively convey the feed from the silo to dispense the feed at the desired location.

12 Claims, 4 Drawing Sheets

US 10,836,296 B2

FEED DISTRIBUTION ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

Figure 1:
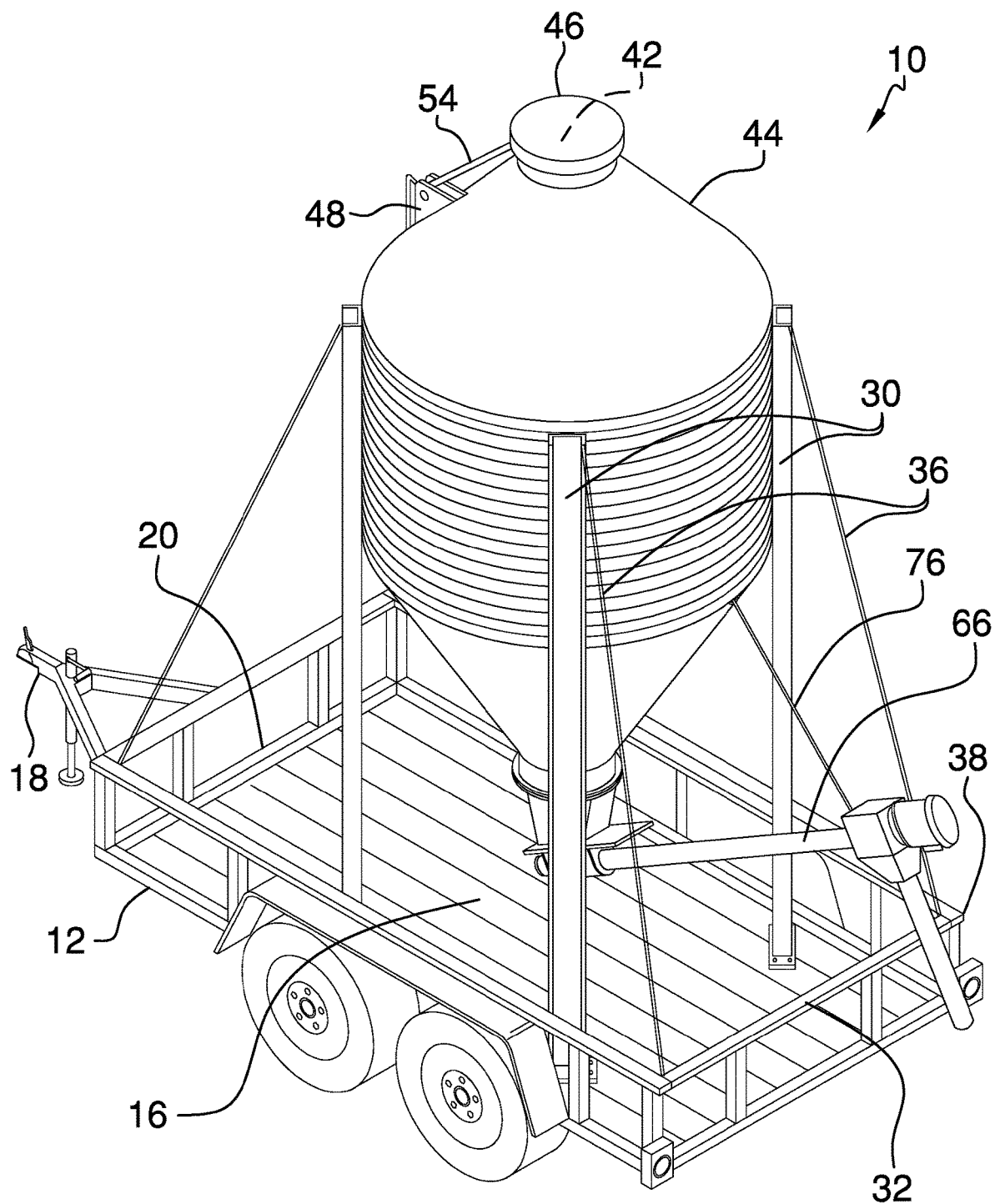

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION (1) Field of the Invention (2) Description of Related Art Including Information Disclosed Under 37 CFR 1.97 and 1.98

The disclosure and prior art relates to distribution assemblies and more particularly pertains to a new distribution assembly for transporting and dispensing feed.

BRIEF SUMMARY OF THE INVENTION

An embodiment of the disclosure meets the needs presented above by generally comprising a trailer and a silo. The silo is coupled to a bed of the trailer and is configured to position feed. The trailer is configured to couple to a vehicle to transport the feed to a desired location. An auger is coupled to a bottom of the silo. The auger is configured to selectively convey the feed from the silo to dispense the feed at the desired location.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein:

FIG. 1 is an isometric perspective view of a feed distribution assembly according to an embodiment of the disclosure.

Figure 2:
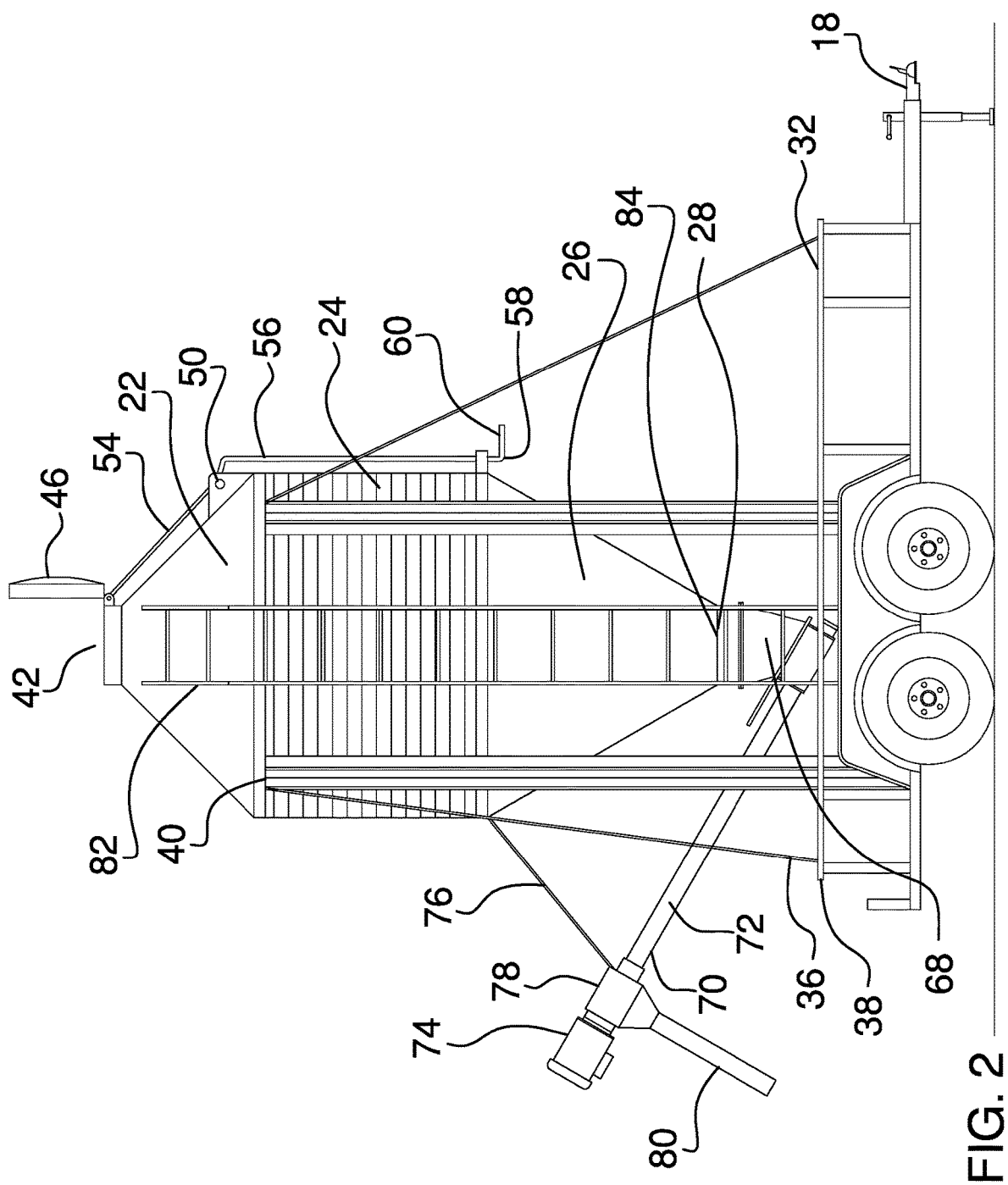
Figure 3:
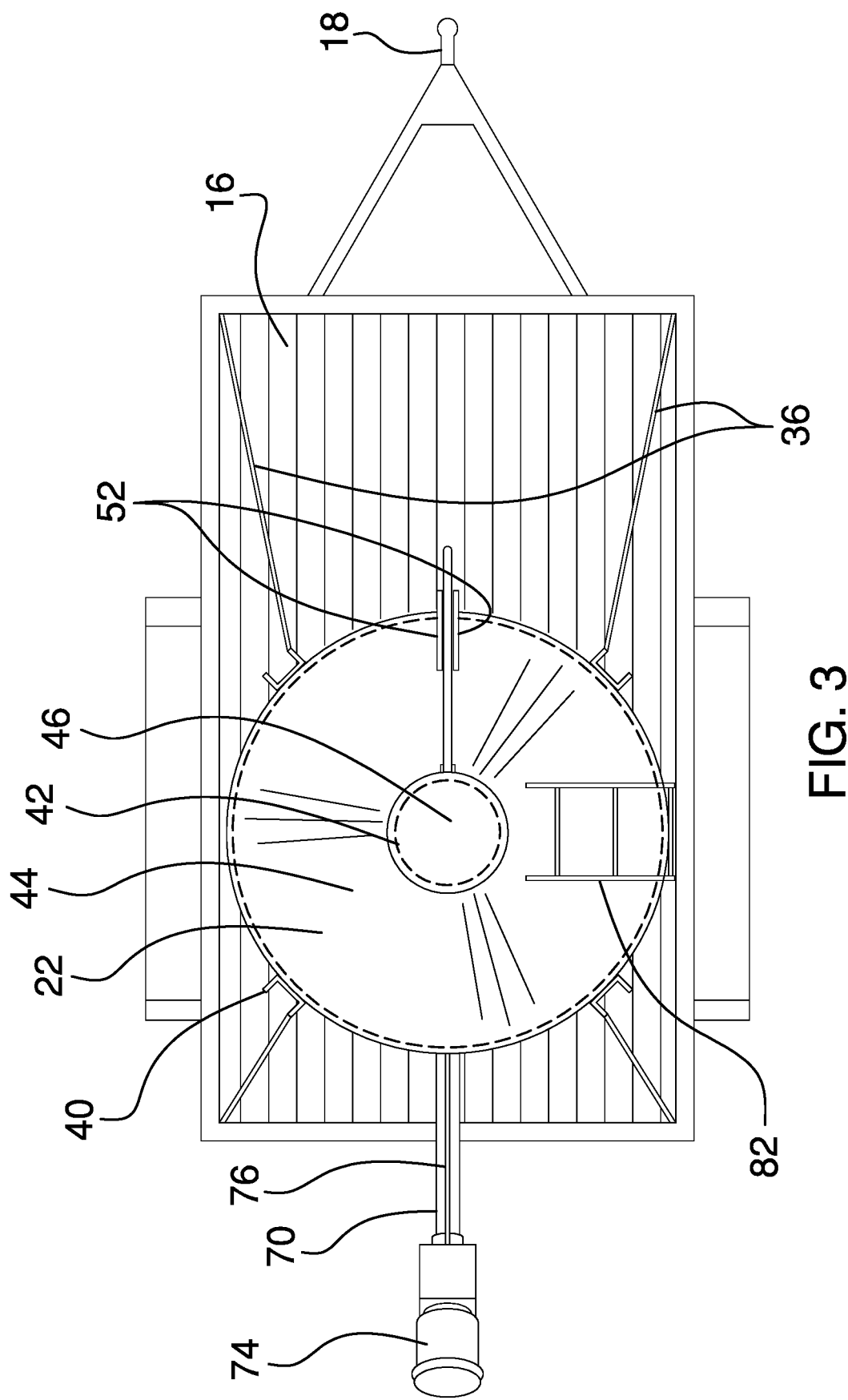
Figure 4:
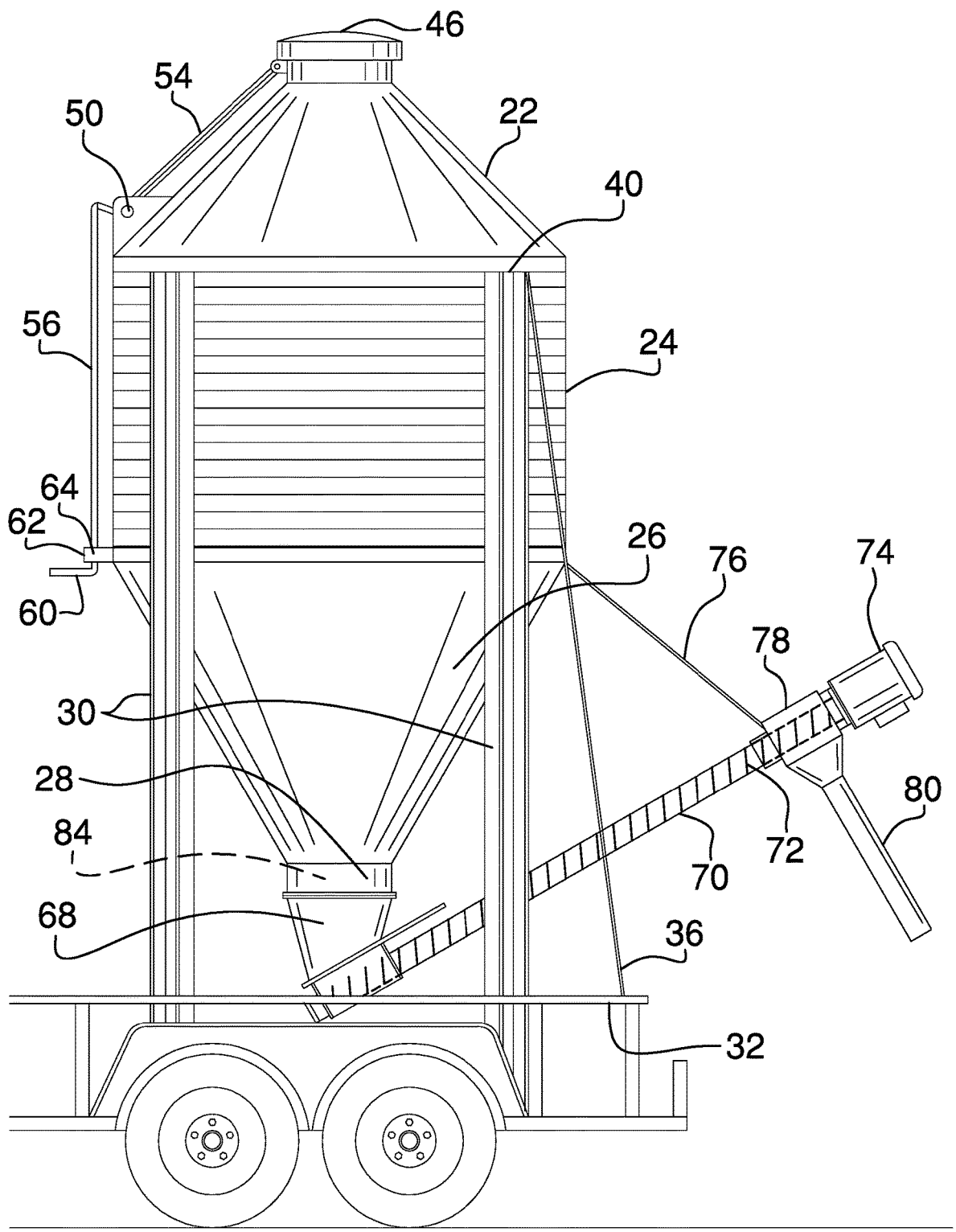

FIG. 2 is a side view of an embodiment of the disclosure.
FIG. 3 is a top view of an embodiment of the disclosure.
FIG. 4 is a side view of an embodiment of the disclosure.

DETAILED DESCRIPTION OF THE INVENTION

With reference now to the drawings, and in particular to FIGS. 1 through 4 thereof, a new distribution assembly embodying the principles and concepts of an embodiment of the disclosure and generally designated by the reference numeral 10 will be described.

As best illustrated in FIGS. 1 through 4, the feed distribution assembly 10 generally comprises a trailer 12 and a silo 14. The silo 14 is coupled to a bed 16 of the trailer 12 and is configured to position feed, such as corn. The trailer 12 is configured to couple to a vehicle, such as a tractor and a truck, to transport the feed to a desired location. A hitch 18 is coupled to a front end 20 of the trailer 12. The hitch 18 is configured to couple the trailer 12 to the vehicle.

The silo 14 has an upper section 22, a medial section 24, and a lower section 26. The medial section 24 is cylindrically shaped. The upper section 22 and the lower section 26 are conically shaped, as shown in FIG. 4. The lower section 26 is configured to direct contents of the silo 14 to an orifice 84 positioned in a bottom 28 of the silo 14.

A plurality of beams 30 is coupled to and extends perpendicularly from the bed 16 of the trailer 12. Each beam 30 is coupled to the medial section 24 between the lower section 26 and the upper section 22, as shown in FIG. 2. The beams 30 are positioned to support the silo 14 with the bottom 28 of the silo 14 positioned above the bed 16 of the trailer 12. The plurality of beams 30 comprises four beams 30 that are substantially evenly spaced around the medial section 24.

A rail 32 is coupled to and extends from a perimeter 34 of the bed 16 of the trailer 12. Each of a set of stay wires 36 is coupled to and extends between a respective corner 38 of the rail 32 and an upper end 40 an associated beam 30, as shown in FIG. 3. The set of stay wires 36 is positioned to stabilize the silo 14 on the bed 16 of the trailer 12.

An opening 42 positioned in a top 44 of the silo 14, as shown in FIG. 3. The opening 42 is configured to add the feed to the silo 14. A lid 46 selectively couplable to the silo 14 to close the opening 42. The lid 46 is hingedly coupled to the silo 14.

A bracket 48 is coupled to the upper section 22 proximate to the medial section 24, as shown in FIG. 4. A pivot rod 50 is coupled to and extends between opposing faces 52 of the bracket 48. A first rod 54 is coupled to and extends between the lid 46 and the pivot rod 50. A second rod 56 is coupled to and extends transversely from the pivot rod 50 along the medial section 24 so that a terminus 58 of the second rod 56 is positioned proximate to the lower section 26. A handle 60 is coupled to the terminus 58 of the second rod 56. The handle 60 is configured to be grasped in a hand of a user, positioning the user to selectively pull on the handle 60 to open the lid 46 and to push on the handle 60 to close the lid 46.

A plate 62 is coupled to and extends perpendicularly from the medial section 24 adjacent to the lower section 26. A hole 64 positioned through the plate 62. The second rod 56 is positioned through the hole 64 and is positioned to slide in the hole 64. The plate 62 serves to retain the second rod 56 in position relative to the silo 14.

An auger 66 is coupled to the bottom 28 of the silo 14, as shown in FIG. 4. The auger 66 is configured to selectively convey the feed from the silo 14 to dispense the feed at the desired location.

The auger 66 comprises a chute 68 that is coupled to the bottom 28 of the silo 14 so that feed falling through the orifice 84 enters the chute 68. A pipe 70 is coupled to and extends from the chute 68. A screw conveyer 72 positioned in the pipe 70. A motor 74 is coupled to the pipe 70. The motor 74 is operationally coupled to the screw conveyer 72. The motor 74 is positioned to selectively rotate the screw conveyer 72 to convey the feed from the chute 68 through the pipe 70 to dispense at the desired location. The motor 74 is positioned distal from the chute 68.

A line 76 is coupled to the lower section 26 of the silo 14 adjacent to the medial section 24. The line 76 is coupled to the pipe 70 distal from the chute 68. The line 76 is positioned to support the pipe 70 transversely to the bed 16.

A connector 78 is coupled to the pipe 70 distal from the chute 68. The connector 78 is configured to direct the feed perpendicularly from the pipe 70. A tube 80 is coupled to and extends from the connector 78. The tube 80 is configured to direct the feed into a container and to continuously stream the feed when the trailer 12 is locomoting.

In another embodiment of the invention, as shown in FIG. 2, a ladder 82 is coupled to and extends substantially perpendicularly from the bed 16. The ladder 82 is coupled to the medial section 24. The ladder 82 extends angularly from the medial section 24 along the upper section 22 to proximate to the opening 42. The ladder 82 is configured to be climbed 16 by the user to inspect the contents of the silo 14.

In use, the feed is added to the silo 14 through the opening 42 and the opening 42 is closed with lid 46. The trailer 12 is transported to the desired location, positioning the user to dispense the feed from the silo 14 using the auger 66.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A feed distribution assembly comprising:
a trailer;
a silo coupled to a bed of the trailer wherein the silo is configured for positioning feed wherein the trailer is configured for coupling to a vehicle for transporting the feed to a desired location, the silo having an upper section, a medial section, and a lower section, the medial section being cylindrically shaped, the upper section and the lower section being conically shaped wherein the lower section is configured for directing contents of the silo to an orifice positioned in the bottom of the silo;
an auger coupled to a bottom of the silo wherein the auger is configured for selectively conveying the feed from the silo for dispensing the feed at the desired location, the auger being angled to extend upwardly and away from the bottom of the silo, the auger comprising
a chute coupled to the bottom of the silo such that feed falling through the orifice enters the chute,
a pipe coupled to and extending from the chute, the pipe being angled relative to the silo such that the pipe extends upwardly and away from the bottom of the silo,
a screw conveyer positioned in the pipe, and
a motor coupled to the pipe, the motor being operationally coupled to the screw conveyer wherein the motor is positioned for selectively rotating the screw conveyer for conveying the feed from the chute through the pipe for dispensing at the desired location;
a connector coupled to the pipe distal from the chute wherein the connector is configured for directing the feed perpendicularly from the pipe; and
a tube coupled to and extending from the connector wherein the tube is configured for directing the feed into a container and for continuously streaming the feed when the trailer is locomoting, the tube being perpendicular to the pipe such that the tube extends downwardly and away from the silo.

2. The assembly of claim 1, further including a hitch coupled to a front end of the trailer wherein the hitch is configured for coupling the trailer to the vehicle.

3. The assembly of claim 1, further including a plurality of beams coupled to and extending perpendicularly from the bed of the trailer, each beam being coupled to the medial section between the lower section and the upper section wherein the beams are positioned for supporting the silo with the bottom of the silo positioned above the bed of the trailer.

4. The assembly of claim 3, further including the plurality of beams comprising four beams substantially evenly spaced around the medial section.

5. The assembly of claim 4, further comprising:
a rail coupled to and extending from a perimeter of the bed of the trailer; and
a set of stay wires, each stay wire being coupled to and extending between a respective corner of the rail and an upper end an associated beam wherein the set of stay wires is positioned for stabilizing the silo on the bed of the trailer.

6. The assembly of claim 1, further comprising:
an opening positioned in a top of the silo wherein the opening is configured for adding the feed to the silo; and
a lid selectively couplable to the silo for closing the opening.

7. The assembly of claim 6, further including comprising:
the lid being hingedly coupled to the silo;
a bracket coupled to the upper section proximate to the medial section;

a pivot rod coupled to and extending between opposing faces of the bracket;

a first rod coupled to and extending between the lid and the pivot rod;

a second rod coupled to and extending transversely from the pivot rod along the medial section such that a terminus of the second rod is positioned proximate to the lower section; and a handle coupled to the terminus of the second rod wherein the handle is configured for grasping in a hand of a user positioning the user for selectively pulling on the handle for opening the lid and pushing on the handle for closing the lid.

8. The assembly of claim 7, further comprising:

a plate coupled to and extending perpendicularly from the medial section adjacent to the lower section; and a hole positioned through the plate, the second rod being positioned through the hole wherein the second rod is positioned for sliding in the hole.

9. The assembly of claim 6, further including a ladder coupled to and extending substantially perpendicularly from the bed, the ladder being coupled to the medial section, the ladder extending angularly from the medial section along the upper section to proximate to the opening wherein the ladder is configured for climbing by the user for inspecting the contents of the silo.

10. The assembly of claim 1, further including the motor being positioned distal from the chute.

11. The assembly of claim 1, further including a line coupled to the lower section of the silo adjacent to the medial section, the line being coupled to the pipe distal from the chute wherein the line is positioned for supporting the pipe transversely to the bed.

12. A feed distribution assembly comprising:

a trailer;

a silo coupled to a bed of the trailer wherein the silo is configured for positioning feed wherein the trailer is configured for coupling to a vehicle for transporting the feed to a desired location, the silo having an upper section, a medial section, and a lower section, the medial section being cylindrically shaped, the upper section and the lower section being conically shaped wherein the lower section is configured for directing contents of the silo to an orifice positioned in a bottom of the silo;

a hitch coupled to a front end of the trailer wherein the hitch is configured for coupling the trailer to the vehicle;

a plurality of beams coupled to and extending perpendicularly from the bed of the trailer, each beam being coupled to the medial section between the lower section and the upper section wherein the beams are positioned for supporting the silo with the bottom of the silo positioned above the bed of the trailer, the plurality of beams comprising four beams substantially evenly spaced around the medial section;

a rail coupled to and extending from a perimeter of the bed of the trailer;

a set of stay wires, each stay wire being coupled to and extending between a respective corner of the rail and an upper end an associated beam wherein the set of stay wires is positioned for stabilizing the silo on the bed of the trailer;

an opening positioned in a top of the silo wherein the opening is configured for adding the feed to the silo;

a lid selectively couplable to the silo for closing the opening, the lid being hingedly coupled to the silo;

a bracket coupled to the upper section proximate to the medial section;

a pivot rod coupled to and extending between opposing faces of the bracket;

a first rod coupled to and extending between the lid and the pivot rod;

a second rod coupled to and extending transversely from the pivot rod along the medial section such that a terminus of the second rod is positioned proximate to the lower section;

a handle coupled to the terminus of the second rod wherein the handle is configured for grasping in a hand of a user positioning the user for selectively pulling on the handle for opening the lid and pushing on the handle for closing the lid;

a plate coupled to and extending perpendicularly from the medial section adjacent to the lower section;

a hole positioned through the plate, the second rod being positioned through the hole wherein the second rod is positioned for sliding in the hole;

a ladder coupled to and extending substantially perpendicularly from the bed, the ladder being coupled to the medial section, the ladder extending angularly from the medial section along the upper section to proximate to the opening wherein the ladder is configured for climbing by the user for inspecting the contents of the silo;

an auger coupled to the bottom of the silo wherein the auger is configured for selectively conveying the feed from the silo for dispensing the feed at the desired location, the auger comprising:

a chute coupled to the bottom of the silo such that feed falling through the orifice enters the chute, a pipe coupled to and extending from the chute, the pipe being angled to extend upwardly and away from said bottom of said silo, a screw conveyer positioned in the pipe, and a motor coupled to the pipe, the motor being operationally coupled to the screw conveyer wherein the motor is positioned for selectively rotating the screw conveyer for conveying the feed from the chute through the pipe for dispensing at the desired location, the motor being positioned distal from the chute;

a line coupled to the lower section of the silo adjacent to the medial section, the line being coupled to the pipe distal from the chute wherein the line is positioned for supporting the pipe transversely to the bed;

a connector coupled to the pipe distal from the chute wherein the connector is configured for directing the feed perpendicularly from the pipe; and a tube coupled to and extending from the connector wherein the tube is configured for directing the feed into a container and for continuously streaming the feed when the trailer is locomoting, said tube being perpendicular to the pipe wherein the tube extends downwardly from the pipe and away from the silo.

* * * * *